Patented May 18, 1926.

1,585,058

UNITED STATES PATENT OFFICE.

WILLIAM HUNTER VOLCK, OF WATSONVILLE, CALIFORNIA, ASSIGNOR TO CALIFORNIA SPRAY-CHEMICAL COMPANY, OF WATSONVILLE, CALIFORNIA, A CORPORATION OF CALIFORNIA.

POWDERED SULPHUR AND METHOD OF MAKING THE SAME.

No Drawing.   Application filed August 13, 1923. Serial No. 657,191.

The invention relates to powdered sulphur to be used principally on growing crops to control mildews and certain insects and mites.

An object of the invention is to provide a very finely divided substantially pure powdered sulphur which will not cake or lump, which flows freely in dusting machines and which possesses great adhesive properties so that it remains on the foliage.

Another object of the invention is to provide a method of making a very finely divided powdered sulphur which will not cake or lump.

The invention possesses other advantageous features, some of which with the foregoing, will be set forth at length in the following description, wherein I shall outline in full the characteristics of the product of my invention and the method of making the same. In said description I have set forth one method of making the product of my invention but it is to be understood that I do not limit myself to such method, since the invention, as set forth in the claims, may be capable of production by a plurality of methods.

One of the largest uses of sulphur is its application in elementary form to growing crops to control mildews and certain insects and mites. Chief among these uses is the sulphuring of grape-vines to prevent mildew. In order for sulphur to be effective in such uses it must be reduced to a very fine powder which may be readily blown or dusted over the plants or trees and which will remain attached to the foliage for a considerable time. Finely divided sulphur is now produced generally by two methods. The first method is known as sublimation, and in this method the sulphur is volatilized by heat and the resulting vapor cooled in a chamber in which the sulphur is precipitated in finely divided form. The product of this method is known to the trade as sublimed sulphur or flowers of sulphur. The second method consists in milling or grinding lump sulphur or brimstone to a powder of suitable fineness. The product of this second method is known as powdered sulphur or milled sulphur or flour sulphur.

Grinding is a cheaper process than sublimation but it is attended with certain difficulties, chief among which is the tendency of the ground sulphur to pack or revert to lump form, which is difficult to break up and blow as a powder or dust. This packing or lumping of the ground sulphur is due to cohesion between the clean cut surfaces of the particles in the powdered mass. This cohesion has usually been overcome by introducing a foreign body into the powdered sulphur which will prevent an absolute or clean contact between the sulphur particles. The use of finely divided chalk, lime or other filler produces the desired result, but the quantity required (about ten per cent of the total weight) is objectionable since the product can then no longer be regarded as pure sulphur.

In accordance with my invention I prevent cohesion of the fine sulphur particles by the introduction of such small amounts of foreign material that the percentage of sulphur is not reduced below 99% plus in the finished products. Such a product is considered in the trade as pure sulphur.

In accordance with my invention I produce a powdered sulphur in which the individual particles are coated with oil or an oily substance which reduces to a minimum the tendency to cohere. The oil which is employed to coat the particles may be oil which is naturally contained in the sulphur or may be oil which is added to the sulphur either before, after or during the grinding operation. The mere grinding of the sulphur in the presence of a small amount of oil will not produce sufficient distribution of the oil to coat the individual particles of the sulphur to such an extent that cohesion is prevented or reduced to a minimum. I have provided a process for controlling the distribution of the oil so that substantially every particle is coated. This is accomplished by introducing into the sulphur an emulsifying agent which takes up the oily matter and distributes it completely over the surfaces of the sulphur particles.

The emulsifying agent may be soap or other organic colloid. I have found that organic colloids are best suited to the purpose and that sulphite waste from the sulphite paper pulp is especially advantageous. The amount of emulsifying agent required is from ⅛ to ¼ of 1 per cent of the weight of the sulphur and the amount of oil required varies from zero to 1/10 of one per cent.

Practically all crude sulphurs contain a small percentage of oil or asphaltic matter. When this percentage is great enough it is not necessary to add the oil to the sulphur. When the oil contained naturally in the sulphur is not in sufficient quantity to coat the particles of sulphur, then oil is added to the sulphur. The amount of water added with the colloid is determined by the temperature and humidity of the atmosphere and other conditions of grinding. This amount must not be in excess of the quantity which will be evaporated during the process of milling and under the conditions of operation known to the inventor varies from 1 to 4 per cent of the total weight of sulphur. The presence of water in the emulsifying agent not only operates to distribute the oil throughout the mass, but the evaporation of the water in the mill reduces the temperature of grinding. The temperature of grinding is very important, since sulphur fractures more readily and grinds finer at lower temperatures in the mill. For this reason the liquid emulsifying agent not only operates to distribute the oil throughout the mass but increases the fineness of the grind and the total quantity which can be put through the mill. The water which has been added is totally evaporated during the process of milling, so that the finished product is dry.

In order to introduce the emulsifying agent into the sulphur mass before milling it is necessary to crush or pre-mill the lump sulphur. This is done by running the sulphur through any form of crusher or rough milling machine and then screening to remove lumps larger than a small pea. The resulting material is a mixture of coarse and fine particles which flows readily and easily mixes with the emulsifying agent. Mixing may be done by shoveling in a bin or in a rotary mixer. The sulphur mass mixed with the emulsifying agent is now ready for the pulverizing mill. This mill may be of the impact type or semi-impact and crushing type, but it is desirable that the pulverized material be removed by an air current and finally discharged into a dust collector in order to remove the water which has been added for the purpose of distributing the emulsifying agent. When it is necessary to add oil to the sulphur I prefer to emulsify it in the liquid emulsifying agent by agitation. In my experiments I have found that a medium grade of lubricating oil is well suited for the purpose of rendering the sulphur particles non-cohesive.

The proportions of water, oil and emulsifying agent which are to be added to any batch of sulphur are variable with the oil content of the sulphur and the humidity and temperature of the atmosphere. The proportions to be added are usually determined by a test, the procedure of which is substantially as follows: 100 pounds of pre-milled sulphur is mixed with ¼ pound of organic colloid (dried sulphite waste) and 3 pounds of water, the sulphite waste being first dissolved in the water. The mixture is then passed through a fine grinding mill and the character of the product noted. If the product is free from lumps, but too damp, the quantity of water is reduced. If the product is lumpy and dry the amount of water is increased. If increasing the water to 5 per cent fails to produce the desired result, the amount of water is again reduced to 3 pounds and $\frac{1}{10}$ pound of emulsified lubricating oil is added to the mass. This last addition corrects any tendency to lump, but it is necessary only when the oil content of the sulphur is exceptionally small. In general, the first proportions chosen are correct for average conditions of temperature and humidity, as found in the central coast areas of California. During dry, warm weather the amount of water has to be increased and when cool, moist weather conditions prevail the amount of water is correspondingly diminished.

The desired texture of the finely divided powdered sulphur is a fine and fluffy powder (at least 85% passing through a screen having two hundred apertures to the linear inch) which will not ball in the hand or creak or squeak under pressure, or a powder in which the tendency to ball in the hand is reduced to a negligible minimum. Such a powder does not pack into a hard mass in the sacks or packages in which it is marketed and is always ready for use in the various types of dusters and blowers designed for sulphuring vines and other crops. In actual practice, the users of the dusting sulphur produced in accordance with my invention find that the sulphur covers from 20 to 30 per cent greater acreage than they were previously able to dust with the same quantity of other forms of finely divided sulphur. They also found that the dust distributed more evenly over the foliage and remained attached thereto in spite of wind and light rain. The useful action of sulphur against plant parasites is due to its vapor in elementary form. The vaporization of sulphur in the air depends upon the temperature and the extent of the exposed surface. The concentration of the vapor so produced varies inversely with the distance from the vaporization surface. The powdered sulphur of my invention, on account of its extreme fineness has great power of adherence to the foliage and its useful action is improved due to the intimacy of contact of the particles with the plant parasites.

I claim:

1. Powdered sulphur, the individual particles of which are coated with oil which minimizes the cohesion of the particles.

2. A mixture containing powdered sulphur and not over one per cent by weight of an oil and an emulsifying agent.

3. Substantially pure powdered sulphur not less than 85% of which will pass through a screen having 200 apertures to the linear inch the individual particles of which are coated with oil, thus producing a product, which will not ball when pressed in the hand and which will not creak under pressure.

4. The method of making powdered sulphur which comprises grinding the sulphur and coating the ground particles with oil.

5. The method of making powdered sulphur which comprises grinding the sulphur and distributing the oil contained in the sulphur uniformly over the surfaces of the particles.

6. The method of making powdered sulphur which comprises grinding the sulphur in the presence of an emulsifying agent to distribute the oil contained in the sulphur uniformly over the surfaces of the particles.

7. The method of making powdered sulphur which comprises grinding the sulphur in the presence of oil and an emulsifying agent.

8. A mixture comprising by weight from a trace to one tenth of one per cent of an oil, from one eighth to one quarter of one per cent of an emulsifying agent, and the remainder powdered sulphur.

9. The method of making powdered sulphur which comprises mixing the sulphur with oily material and an emulsifying agent.

10. The method of making powdered sulphur which comprises grinding the sulphur in the presence of an organic colloid and an oily substance.

11. The method of making powdered sulphur which comprises grinding the sulphur in the presence of sulphite paper waste and an oily substance.

In testimony whereof, I have hereunto set my hand.

WILLIAM HUNTER VOLCK.